(12) United States Patent
Wang et al.

(10) Patent No.: US 8,498,382 B2
(45) Date of Patent: **\*Jul. 30, 2013**

(54) SYSTEM AND METHOD FOR EVALUATING AND TROUBLESHOOTING A DIGITAL SUBSCRIBER LINE SYSTEM

(75) Inventors: Jin Wang, Freemont, CA (US); Baofeng Jiang, Pleasanton, CA (US); Xidong Wu, Livermore, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,040

(22) Filed: Jun. 7, 2012

(65) Prior Publication Data

US 2012/0243668 A1    Sep. 27, 2012

Related U.S. Application Data

(63) Continuation of application No. 12/006,299, filed on Jan. 2, 2008, now Pat. No. 8,218,732.

(51) Int. Cl.
*H04M 1/24*    (2006.01)

(52) U.S. Cl.
USPC ............... 379/1.03; 379/14.01; 702/182

(58) Field of Classification Search
USPC ........... 379/22, 1.01, 1.03, 2, 14.01, 26.01, 379/27.08, 26.02, 28; 370/352; 702/182, 702/179
See application file for complete search history.

(56) References Cited

U.S. PATENT DOCUMENTS

| | | | |
|---|---|---|---|
| 6,889,339 B1 | 5/2005 | D'Amico et al. | |
| 6,978,015 B1 | 12/2005 | Erickson et al. | |
| 7,027,405 B1 | 4/2006 | Khadavi | |
| 7,251,754 B2 | 7/2007 | Maxwell | |
| 7,272,209 B2 * | 9/2007 | Jiang et al. | 379/1.04 |
| 7,881,438 B2 | 2/2011 | Cioffi et al. | |
| 2007/0208537 A1 * | 9/2007 | Savoor et al. | 702/182 |
| 2007/0230667 A1 | 10/2007 | Warner et al. | |
| 2009/0074153 A1 | 3/2009 | Wu et al. | |

* cited by examiner

*Primary Examiner* — Olisa Anwah
(74) *Attorney, Agent, or Firm* — Wolff & Samson, PC

(57) ABSTRACT

Disclosed is a method and system for evaluating and troubleshooting a DSL system in a plurality of DSL systems having a common static characteristic. The plurality of DSL systems are ranked based on a ranking characteristic different than the common static characteristic.

18 Claims, 3 Drawing Sheets

SYSTEM AND METHOD FOR EVALUATING AND TROUBLESHOOTING A DIGITAL SUBSCRIBER LINE SYSTEM

This application is a continuation of U.S. patent application Ser. No. 12/006,299, filed Jan. 2, 2008, which is entirely incorporated herein by reference.

BACKGROUND OF THE INVENTION

The present invention is generally directed to digital subscriber line (DSL) systems and more particularly to evaluating and troubleshooting DSL systems.

DSL, or xDSL, is a family of technologies that provide digital data transmission over wires of a local telephone network. The two main categories of DSL are Asymmetric Digital Subscriber Line (ADSL) and Symmetric Digital Subscriber Line (SDSL). In ADSL, upload speed is typically lower than download speed. In SDSL, upload and download speeds are typically the same. Two other types of DSL technologies are high speed DSL (HDSL) and very high speed DSL (VDSL).

Several DSL connections, like ADSL and VDSL, typically work by dividing the frequencies used in a single phone line into two primary 'bands'. Data is carried over a high frequency band (e.g., 25 kHz and above) whereas voice is carried over a lower frequency band (e.g., 4 kHz and below). A DSL filter is typically installed on each phone or inside a network interface device (NID) which connects a customer's inside wiring to the telephone network. This filter typically filters out high frequencies from the phone, so that the phone only sends or receives the lower frequencies (the human voice), creating two independent 'bands'. As a result, a DSL modem and the phone can simultaneously use the same phone line without interfering with each other.

DSL connections may experience problems. DSL service providers typically detect and troubleshoot DSL service problems by comparing service quality parameters to fixed thresholds. If all crucial parameters exceed their thresholds, the service is believed to be good. Otherwise, an alarm is often issued to denote a service problem. For example, a VDSL system (e.g., line) is required to provide 25 Mb/s bandwidth for "triple-play" (data, voice over IP, and video) service. The bandwidth of the VDSL system is compared to this fixed bandwidth threshold of 25 Mb/s to determine if the VDSL system is operating in an acceptable manner.

Comparing performance parameters to a fixed threshold has several disadvantages. First, if a DSL system is able to perform much better than the chosen threshold but, due to some impairments, it fails to do so, comparing to a fixed threshold will not issue any alarm and the opportunity of providing better service (which is typically more profitable for an ISP) may be missed. For example, a short VDSL line, say 1000 ft, usually can provide 50 Mb/s bandwidth. However, with a bridged tap in the loop, the line can't sustain a rate above 28 Mb/s. Though 28 Mb/s bandwidth exceeds the 25 Mb/s threshold, the line will not be able to qualify for multiple high definition (HD) television (TV) service in the future which usually requires 36 Mb/s. Second, a DSL system slightly above a threshold may still be experiencing one or more problems. For example, a 1 kilofoot DSL line that provides 28 Mb/s (while it should provide 50 Mb/s) is quite possibly encountering excessive ambient noise and/or may have cable issues such as bridged tap. Cable issues and excessive ambient noise often become worse over time. Thus, even if a DSL system meets the threshold today, the DSL system may not meet the threshold a month later. It is usually cost effective to solve a problem earlier rather than later.

It is also typically quite difficult to establish and maintain such a threshold system due to DSL technology evolution. In particular, upgrades in DSL technology result in different thresholds being relevant. Threshold changes may cause confusion as to which threshold is relevant for a given DSL system. The potential for confusion is increased when different DSL speed thresholds are employed for different loop lengths, such as 40 Mb/s for 1 kft lines, 30 Mb/s for 2 kft lines, etc.

As a result, there remains a need for an improved technique to evaluate and troubleshoot DSL systems.

BRIEF SUMMARY OF THE INVENTION

The present invention provides an improved technique for evaluating and troubleshooting a DSL system. DSL systems having a common characteristic are identified. The identified DSL systems are ranked based on a ranking characteristic different than the common characteristic. The ranking can identify a DSL system in the plurality of DSL systems that is experiencing a problem.

In one embodiment, the ranking characteristic is a dynamic characteristic such as, for example, speed, noise margin, background noise, crosstalk level, and/or echo strength. The common characteristic is a static characteristic and may include, for example, loop length, geographic location, cable age, cable insulation type, etc. In one embodiment, an input is received specifying the common characteristic and/or the ranking characteristic.

These and other advantages of the invention will be apparent to those of ordinary skill in the art by reference to the following detailed description and the accompanying drawings.

DETAILED DESCRIPTION

Figure 1:
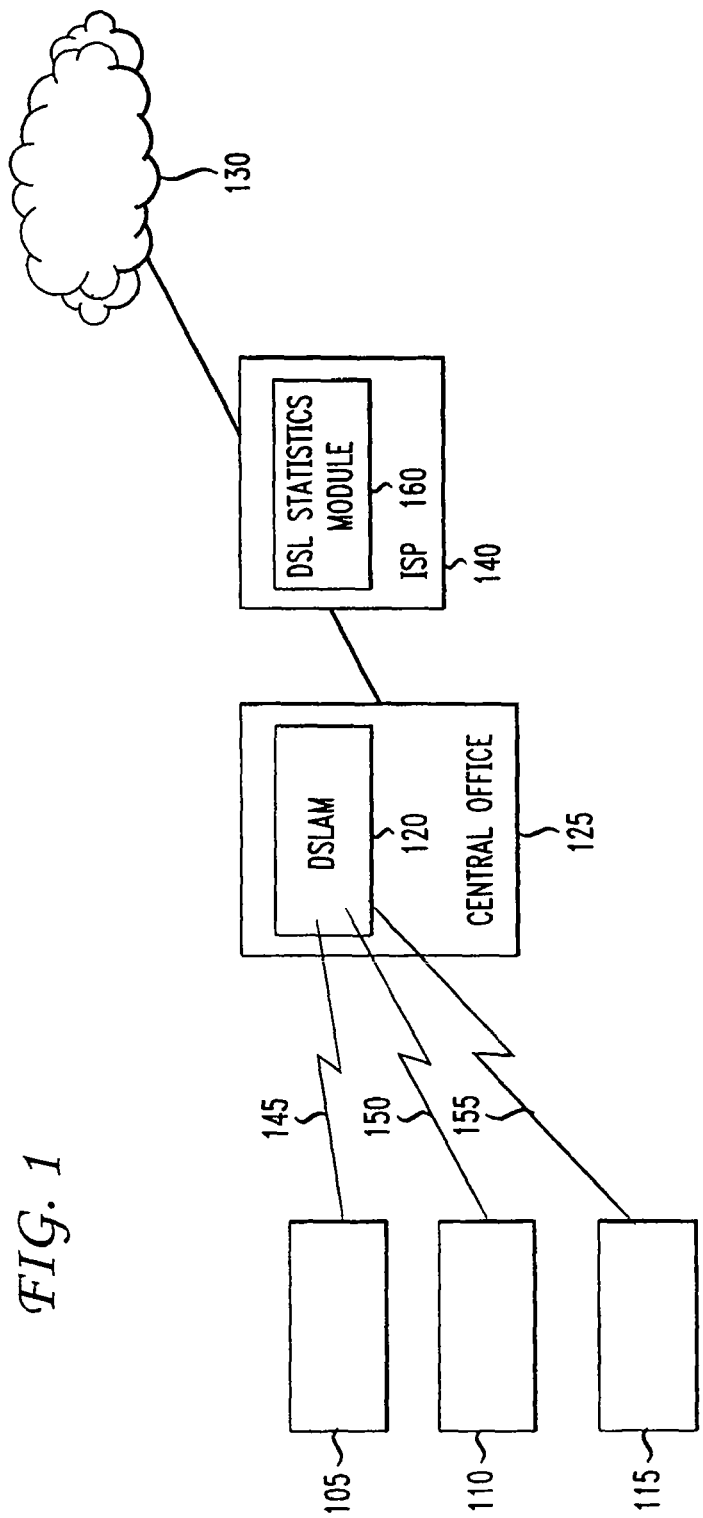
FIG. 1 is a block diagram of a network having three DSL modems in communication with a digital subscriber line access multiplexer in accordance with an embodiment of the present invention.

FIG. 1 is a block diagram of a network 100 having three DSL modems 105, 110, 115 in communication with a digital subscriber line access multiplexer (DSLAM) 120. The DSLAM 120 is located at a central office 125. The DSLAM 120 aggregates traffic from multiple DSL modems (e.g., modems 105, 110, 115) before sending it to the Internet 130 via an Internet Service Provider (ISP) 140. The DSL modems 105, 110, 115 connect to the DSLAM 120 via respective DSL lines 145, 150, 155. Although shown with three DSL modems 105, 110, 115, three DSL lines 145, 150, 155, and one DSLAM 120, any number of DSL modems, DSL lines, and/or DSLAMs may be present in the network 100.

The ISP 140 includes a DSL statistics module 160. The DSL statistics module 160 is a module (e.g., a software module) that gathers statistics associated with a group of DSL systems having a common characteristic. A DSL system may include the DSL modems 105, 110, 115, the DSL lines 145, 150, 155, and/or the DSLAM(s) 120 present in network 100. The common characteristic is a fixed (i.e., static) characteristic and may include, for example, loop length (of a DSL line). For example, if a network has two hundred DSL lines having a loop length of 1 kft and one hundred DSL lines having a loop length of 2 kft, the DSL statistics module 160 may collect separate statistics on each group of DSL lines. In one embodiment, the common characteristic of DSL systems is input to the DSL statistics module 160. Although shown as part of the ISP 140, the DSL statistics module 160 may execute in any component in network 100, such as the central office 125.

Statistics for DSL systems may be obtained periodically, continuously, a fixed number of times, based on a schedule, etc. Once statistics are obtained for a group of DSL systems having a common characteristic in network 100, the DSL statistics module 160 can then rank the DSL systems in the group according to a ranking characteristic. The ranking characteristic is a dynamic characteristic based on performance of DSL systems (e.g., speed, noise margin and transmission error) and/or line or loop conditions (e.g., bridged tap, background noise, and echo strength). The ranking characteristic may be input to the DSL statistics module 160.

For example, statistics are obtained for a group of DSL systems in network 100 having a loop length of 2 kft. The DSL statistics module 160 ranks the DSL systems in the group according to a ranking characteristic (i.e., not loop length), such as speed. If a DSL system ranks near the bottom of the group, then it is highly likely that the DSL system is experiencing a cable fault and/or is exposed to noise. In one embodiment, the DSL statistics module 160 identifies a DSL system as having a problem if the DSL system is below a predetermined ranking (e.g., is in the bottom 10% of the group of DSL systems).

Further, if the rank of DSL components in an entire DSL system is known, the DSL statistics module 160 can average their ranks to determine the rank for the system. This average value for the DSL system can be ranked among DSL systems having a common characteristic to identify a problem with a DSL system. For example, the DSL statistics module 160 averages the rank of every VDSL line in a DSLAM to obtain the rank for the entire DSLAM. If the rank for the DSLAM is low, then this DSLAM is performing poorly compared to other DSLAMs having a common characteristic in the network 100. The DSLAM performing poorly may then be investigated (automatically or manually).

In one embodiment, the DSL statistics module 160 ranks the DSL systems numerous times, with each ranking associated with a different ranking characteristic. For example, in a typical VDSL network, a 1 kft VDSL line has the following speed percentile values:

| | |
|---|---|
| 1$^{st}$ percentile | 34.8 Mb/s |
| 10$^{th}$ percentile | 48.9 Mb/s |
| 25$^{th}$ percentile | 53.1 Mb/s |
| 50$^{th}$ percentile | 56.4 Mb/s |
| 75$^{th}$ percentiie | 58.9 Mb/s |
| 90$^{th}$ percentile | 61.4 Mb/s |
| 99$^{th}$ percentile | 63.9 Mb/s |

A 1 kft VDSL line with a speed of 30 Mb/s will be ranked at the bottom 1%. Although the VDSL line exceeds, for instance, a 25 MB/s bandwidth requirement for current Internet Protocol (IP) TV service, the line can run much faster if the impairment is found and removed. For example, a bridge tap may be removed, a cable fault may be fixed, or a line disturber may be removed from the neighborhood in which the VDSL line is located.

The ranking may take into account a threshold. In particular, with the ranking of multiple DSL systems, there is always going to be a bottom group (e.g., a bottom 10%). If a DSL line is in the bottom 10%, however, it may not be identified as having a problem if its ranking characteristic is well above a particular threshold (e.g., its speed is 45 Mb/s and a threshold is set to 35 Mb/s).

The ranking of a DSL system within a group of DSL systems having a common characteristic in order to identify one or more DSL systems that are experiencing problems is independent of technology advances as long as the group is using similar technology.

Figure 2:
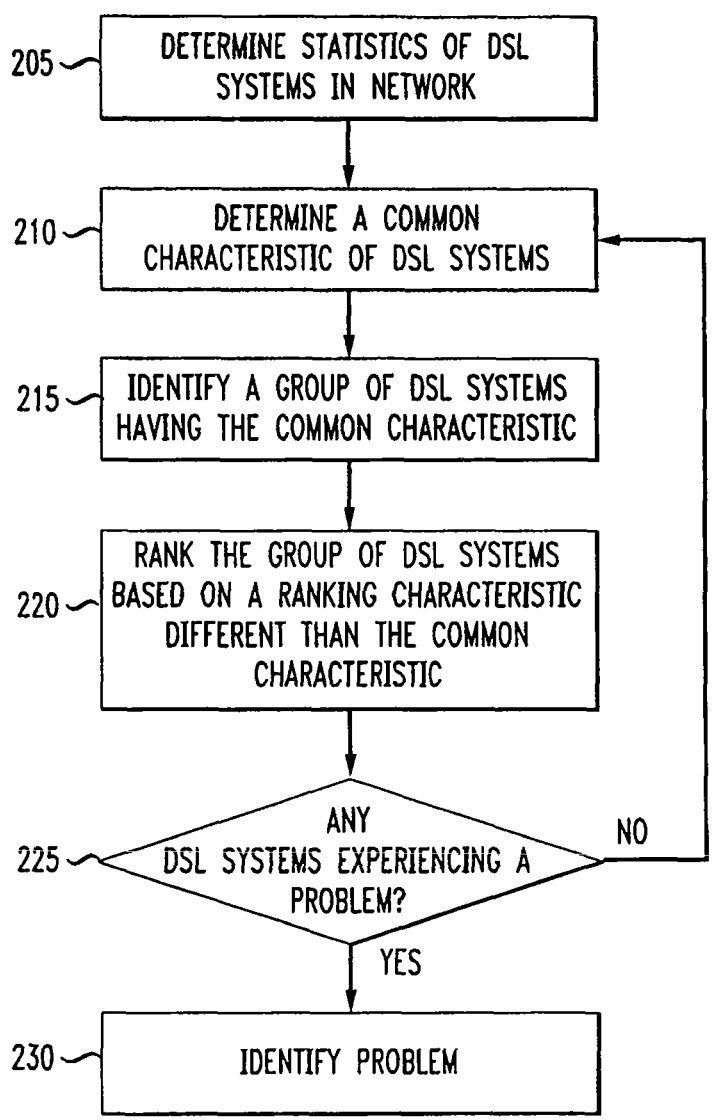
FIG. 2 is a flowchart illustrating the steps performed by a DSL statistics module to evaluate and troubleshoot the DSL systems in the network of FIG. 1.

FIG. 2 shows a flowchart illustrating the steps performed by the DSL statistics module 160 to rank DSL systems having a common characteristic according to a ranking characteristic different than the common characteristic. The DSL statistics module 160 collects statistics associated with a plurality of DSL systems in network 100 in step 205. This step may occur once or any number of times. The DSL statistics module 160 then determines a common characteristic of DSL systems in step 210, such as the loop length of DSL systems. In one embodiment, the DSL statistics module 160 receives the common characteristic as an input. The DSL statistics module 160 then identifies a group of DSL systems having the common characteristic in step 215. The group may be all of or a part of the plurality of DSL systems.

The DSL statistics module 160 then ranks the group of DSL systems having the common characteristic based on a ranking characteristic different than the common characteristic in step 220. As described above, this ranking characteristic may be the speed of DSL lines in a group of DSL lines having the same loop length. This ranking facilitates the determination, in step 225, of any DSL systems experiencing a problem. For example, if a DSL system is ranked at the bottom 5% with respect to speed for all DSL systems having a loop length of 1 kft, and the DSL system is just above a predetermined threshold, then the DSL system is likely experiencing a problem In one embodiment, the problem is identified in step 230. This may result in an investigation, such as an automatic investigation or a manual investigation. If there are no DSL systems experiencing a problem in step 225, then the process returns to step 210 to determine a common characteristic of DSL systems.

By ranking DSL systems, the root cause of service issues can be determined. As a result, the evaluating and troubleshooting of DSL systems can occur via the ranking described herein.

Figure 3:
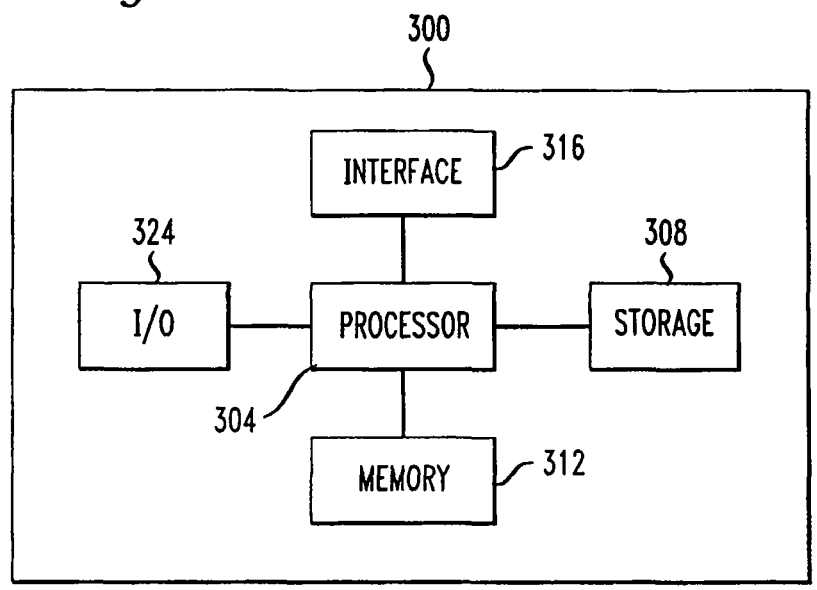
FIG. 3 is a high level block diagram of a computer in accordance with an embodiment of the present invention.

FIG. 3 shows a high level block diagram of a computer 300 which may be used to implement DSL statistics module 160. The computer 300 can, for example, perform the steps described above (e.g., with respect to FIG. 2). Computer 300 contains a processor 304 which controls the overall operation of the computer by executing computer program instructions which define such operation. The computer program instructions may be stored in a storage device 308 (e.g., magnetic disk, database) and loaded into memory 312 when execution of the computer program instructions is desired. Thus, the computer operation will be defined by computer program instructions stored in memory 312 and/or storage 308 and the computer will be controlled by processor 304 executing the computer program instructions. Computer 300 also includes one or more interfaces 316 for communicating with other devices. Computer 300 also includes input/output 324 which represents devices which allow for user interaction with the computer 300 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
    ranking each of a plurality of digital subscriber line systems, wherein the plurality of digital subscriber line systems have a common characteristic, the ranking based on a ranking characteristic different than the common characteristic;
    identifying one of the plurality of digital subscriber line systems falling below a predetermined ranking of the ranking characteristic;
    determining whether the ranking characteristic of the one of the plurality of digital subscriber line systems is above a threshold; and
    determining whether the one of the plurality of digital subscriber line systems is experiencing a problem based on whether the ranking characteristic is above the threshold.

2. The method of claim 1 wherein the predetermined ranking is indicative of a percentile value.

3. The method of claim 1 wherein the common characteristic comprises one of a loop length of the plurality of digital subscriber line systems, a geographic location, an age of a line, and a line insulation type.

4. The method of claim 1 wherein each of the plurality of digital subscriber line systems include one of a digital subscriber line modem, a digital subscriber line, and a digital subscriber line access multiplexer.

5. The method of claim 1 wherein the ranking characteristic comprises one of speed, noise margin, background noise, crosstalk level, and echo strength.

6. The method of claim 1, wherein the ranking characteristic comprises speed, the method further comprising:
    calculating an average speed of all the plurality of digital subscriber line systems;
    determining a respective rank for each of the plurality of digital subscriber line systems based on the average speed;
    determining that a rank of a digital subscriber line systems is low based on a performance of all of the plurality of digital subscriber line systems;
    determining that the digital subscribe line system is experiencing trouble based on the rank; and
    troubleshooting the digital subscribe line system.

7. An apparatus for evaluating a digital subscriber line system comprising:
    a memory storing computer program instructions; and
    a processor communicatively coupled to the memory, the processor configured to execute the computer program instructions, which, when executed on the processor, cause the processor to perform a method comprising:
        ranking each of a plurality of digital subscriber line systems, wherein the plurality of digital subscriber line systems have a common characteristic, the ranking based on a ranking characteristic different than the common characteristic;
        identifying one of the plurality of digital subscriber line systems falling below a predetermined ranking of the ranking characteristic;
        determining whether the ranking characteristic of the one of the plurality of digital subscriber line systems is above a threshold; and
        determining whether the one of the plurality of digital subscriber line systems is experiencing a problem based on whether the ranking characteristic is above the threshold.

8. The apparatus of claim 7 wherein the predetermined ranking is indicative of a percentile value.

9. The apparatus of claim 7 wherein the common characteristic comprises one of a loop length of the plurality of digital subscriber line systems, a geographic location, an age of a line, and a line insulation type.

10. The apparatus of claim 7 wherein each of the plurality of digital subscriber line systems include one of a digital subscriber line modem, a digital subscriber line, and a digital subscriber line access multiplexer.

11. The apparatus of claim 7 wherein the ranking characteristic comprises one of speed, noise margin, background noise, crosstalk level, and echo strength.

12. The apparatus of claim 7, wherein the ranking characteristic comprises speed, the method further comprising:
    calculating an average speed of all the plurality of digital subscriber line systems;
    determining a respective rank for each of the plurality of digital subscriber line systems based on the average speed;
    determining that a rank of a digital subscriber line systems is low based on a performance of all of the plurality of digital subscriber line systems;
    determining that the digital subscribe line system is experiencing trouble based on the rank; and
    troubleshooting the digital subscribe line system.

13. A non-transitory computer readable medium storing computer program instructions, which, when executed on a processor, cause the processor to perform a method comprising:
    ranking each of a plurality of digital subscriber line systems, wherein the plurality of digital subscriber line systems have a common characteristic, the ranking based on a ranking characteristic different than the common characteristic;
    identifying one of the plurality of digital subscriber line systems falling below a predetermined ranking of the ranking characteristic;
    determining whether the ranking characteristic of the one of the plurality of digital subscriber line systems is above a threshold; and
    determining whether the one of the plurality of digital subscriber line systems is experiencing a problem based on whether the ranking characteristic is above the threshold.

14. The non-transitory computer readable medium of claim 13 wherein the predetermined ranking is indicative of a percentile value.

15. The non-transitory computer readable medium of claim 13 wherein the common characteristic comprises one of a loop length of the plurality of digital subscriber line systems, a geographic location, an age of a line, and a line insulation type.

16. The non-transitory computer readable medium of claim 13 wherein each of the plurality of digital subscriber line systems include one of a digital subscriber line modem, a digital subscriber line, and a digital subscriber line access multiplexer.

17. The non-transitory computer readable medium of claim 13 wherein the ranking characteristic comprises one of speed, noise margin, background noise, crosstalk level, and echo strength.

18. The non-transitory computer readable medium of claim 13, wherein the ranking characteristic comprises speed, the method further comprising:
- calculating an average speed of all the plurality of digital subscriber line systems;
- determining a respective rank for each of the plurality of digital subscriber line systems based on the average speed;
- determining that a rank of a digital subscriber line systems is low based on a performance of all of the plurality of digital subscriber line systems;
- determining that the digital subscribe line system is experiencing trouble based on the rank; and
- troubleshooting the digital subscribe line system.

* * * * *